7477X
J. Boynton.
Carding Mach.
Patented Mar. 11, 1833.
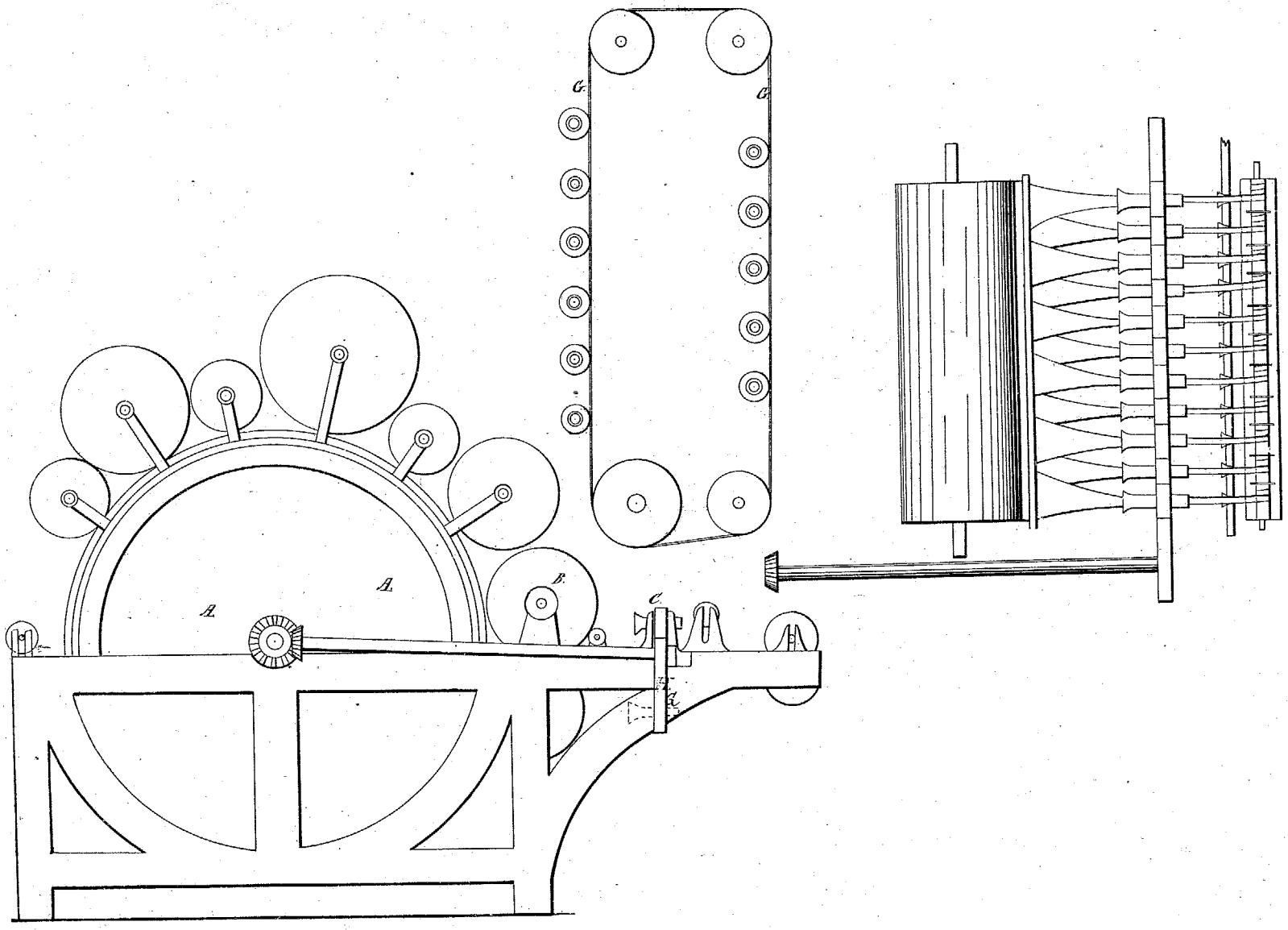
N. PETERS, PHOTO-LITHOGRAPHER, WASHINGTON, D. C.

7477X John Boynton March 11, 1833

Letters Patent

The Schedule referred to in these Letters Patent and making part of the same containing a description in the words of the said John Boynton himself of his improvement in the wool carding Engine or Machine. To all to whom these presents shall come. Be it known that I John Boynton of [illegible] Coventry in the County of Tolland and State of Connecticut have invented a new and useful improvement in the wool carding engine or machine and condensers and in the application of the same to the carding and condensing of cotton & Flax and that the following is a full and exact description of the construction and operation of the said improvement as invented or improved and applied by me. The improvement to which I claim an exclusive right is contained in that part of the machine which makes the fine roping fitted for the spinning Jack or other spinning and it is supposed not necessary to describe the whole machine which has for a long time been in use. The tube spindle rails are made with a flat bottom of wood or metal 3 or more inches wide & a little longer than the cylinders of the machine with upright side pieces between & through which the tube spindles are inserted. Under these spindles runs the belt or strap which turns them by the friction of their own weight laying on the strap. This strap or belt is carried by a pulley upon a shaft or arbor placed in a right angle with the main shaft & driven by bevel gear attached to the main shafts. The tube rails containing the spindles are placed one over the other each to correspond with its doffer cylinder and card doffs. The strap is carried from the top of the pulley under the spindles in the upper tube rail & passing over a pulley at the other end of the rails in an upright stand & then under another pulley below in the same stand and passes

[illegible] which under the spindles on the bottom tube rail to the [illegible] pulleys. The tube spindles are made of one piece of cast iron or other metals. the pulley part is 1/2 inch long & one inch in diameter & may be more or less with a trumpet nose to each into which the roping is gathered & passing through the spindles being drawn by the small rollers at the outer end of the spindles passes off to the spool on which it is wound fit for spinning. The trumpet nose of the spindles may be made of equal diameter to the width of the card hoops from which the roping is to be made.

The great advantage of the trumpet nose is that its circumference on the inside is much greater & creates more friction on the roping & gives it more twist as it comes from the card & makes it solider, more sure and more decent than any other tube now in use & the strap or belt passing in this manner under all the tubes carries them all with equal velocity & supersedes the necessity of a number of bands as has been the usual mode. The improvement in the shape of the tube spindle or condenser and the manner of driving them by laying them all on a single belt or strap. the tubes in the top spindle rail lying on the out side of the belts or strap & those in the bottom spindle rail lying on the inside of the belt or strap, said belt or strap is 1/2 inch wide & that & all other parts of the engine may be varied in size to accommodate the purchaser & the kind of stock that is to be used & the goods to be made & the successful application of the same wool carding engine with the tube or other condensers to the carding and roping or condensing Cotton and Flax, is all that I claim as peculiarly my own invention improvement or discovery (and application) for which I claim security by patent Witness
Will. [illegible]
[illegible] Ashton John Boynton